US012151813B2

(12) United States Patent
Budd et al.

(10) Patent No.: US 12,151,813 B2
(45) Date of Patent: Nov. 26, 2024

(54) SYSTEM AND METHOD FOR CARRYING AN AERONAUTICAL OR LAUNCH VEHICLE TO ALTITUDE FOR RELEASE TO FLIGHT

(71) Applicant: Sky Launch Corporation, Lancaster, CA (US)

(72) Inventors: Gerald D. Budd, Lancaster, CA (US); Charles E. Rogers, Lancaster, CA (US)

(73) Assignee: Sky Launch Corporation, Lancaster, CA (US)

( * ) Notice: Subject to any disclaimer, the term of this patent is extended or adjusted under 35 U.S.C. 154(b) by 189 days.

(21) Appl. No.: 17/372,388

(22) Filed: Jul. 9, 2021

(65) Prior Publication Data

US 2022/0009633 A1 Jan. 13, 2022

Related U.S. Application Data

(60) Provisional application No. 63/050,690, filed on Jul. 10, 2020.

(51) Int. Cl.
*B64D 1/02* (2006.01)
*B64D 5/00* (2006.01)
(Continued)

(52) U.S. Cl.
CPC .............. *B64D 1/02* (2013.01); *B64D 5/00* (2013.01); *B64G 1/005* (2013.01); *B64U 70/20* (2023.01); *F42B 3/006* (2013.01)

(58) Field of Classification Search
CPC . B64G 1/005; B64D 1/02; B64D 1/12; B64D 5/00
See application file for complete search history.

(56) References Cited

U.S. PATENT DOCUMENTS 2,371,640 A * 3/1945 Manson .................. B64D 1/02
244/151 B
2,382,442 A * 8/1945 Rich ....................... F42B 10/56
273/350

(Continued)

FOREIGN PATENT DOCUMENTS

CN 110466768 A * 11/2019
EP 0592259 A1 * 4/1994 ............... B64D 1/02
(Continued)

*Primary Examiner* — Joseph W Sanderson
(74) *Attorney, Agent, or Firm* — Lance M. Pritikin

(57) ABSTRACT

A system and method for carrying an aeronautical or launch vehicle to altitude for release to flight may involve a multiplicity of mounting elements affixed to a carrier aircraft in distributed fashion along a mounting axis. Each mounting element may include a cradle and a retention strap. Each retention strap may be suspendedly attached to a respective cradle, and actuatable from a retention configuration to a release configuration. The retention configuration allows the retention straps to clampingly secure the vehicle to the respective cradles. The actuation of the retention straps from the retention configuration to the release configuration may disable the clamping securement and thereby release the vehicle to drop away from the cradles. For one or more of the retention straps, the actuation may be by way of detonating at least one corresponding pyrotechnic fastener.

4 Claims, 11 Drawing Sheets

(51) Int. Cl.
  *B64G 1/00* (2006.01)
  *B64U 70/20* (2023.01)
  *F42B 3/00* (2006.01)

(56) References Cited

U.S. PATENT DOCUMENTS

| | | | | |
|---|---|---|---|---|
| 2,433,523 | A * | 12/1947 | Mahan | B64D 1/22 |
| | | | | 244/137.4 |
| 2,502,455 | A * | 4/1950 | Hall | B64D 1/02 |
| | | | | 294/82.25 |
| 3,074,320 | A * | 1/1963 | Trifonoff | B64D 1/06 |
| | | | | 294/82.26 |
| 3,089,387 | A * | 5/1963 | Damm | B64D 1/06 |
| | | | | 294/82.26 |
| 3,513,512 | A * | 5/1970 | Phillips | F16B 2/06 |
| | | | | 102/377 |
| 5,626,310 | A | 5/1997 | Kelly | |
| 7,458,544 | B1 | 12/2008 | Sarigul-Klijn et al. | |
| 8,262,015 | B2 * | 9/2012 | Kuroda | B64G 1/005 |
| | | | | 244/3 |
| 8,670,879 | B1 * | 3/2014 | Angelucci | B64D 45/00 |
| | | | | 361/679.01 |
| 8,727,264 | B1 | 5/2014 | Rutan | |
| 8,869,671 | B2 * | 10/2014 | Williamson | B64D 1/04 |
| | | | | 244/137.4 |
| 9,745,063 | B2 * | 8/2017 | London | B64D 5/00 |
| 9,944,410 | B1 | 4/2018 | America | |
| 10,913,534 | B1 * | 2/2021 | Brum | B64D 1/02 |
| 2003/0080241 | A1 | 5/2003 | Shpigler et al. | |
| 2010/0301159 | A1 * | 12/2010 | Schnitzer | B64D 9/00 |
| | | | | 244/54 |
| 2011/0024548 | A1 * | 2/2011 | Kuroda | B64D 3/00 |
| | | | | 244/3 |
| 2014/0048654 | A1 * | 2/2014 | Williamson | B64D 1/12 |
| | | | | 244/137.4 |
| 2014/0202322 | A1 * | 7/2014 | Schnitzer | B64D 1/00 |
| | | | | 89/1.8 |
| 2015/0021428 | A1 | 1/2015 | Rutan | |
| 2016/0039521 | A1 * | 2/2016 | London | B64D 7/08 |
| | | | | 244/2 |
| 2021/0163126 | A1 * | 6/2021 | Gray | B64C 39/02 |
| 2022/0089298 | A1 * | 3/2022 | Budd | B64D 1/12 |

FOREIGN PATENT DOCUMENTS

| | | | | |
|---|---|---|---|---|
| EP | 2279945 | B1 | 1/2015 | |
| FR | 2987345 | A1 * | 8/2013 | B64D 5/00 |
| GB | 2135031 | A * | 8/1984 | B64D 1/02 |

* cited by examiner

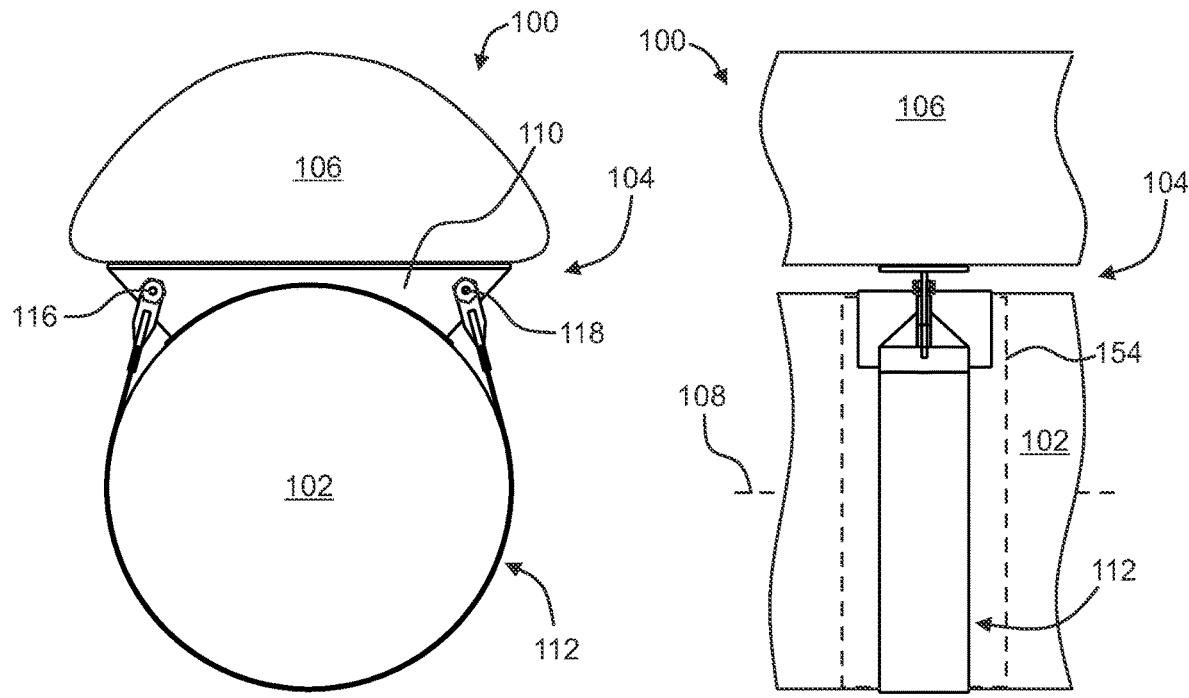
FIG. 14
FIG. 15
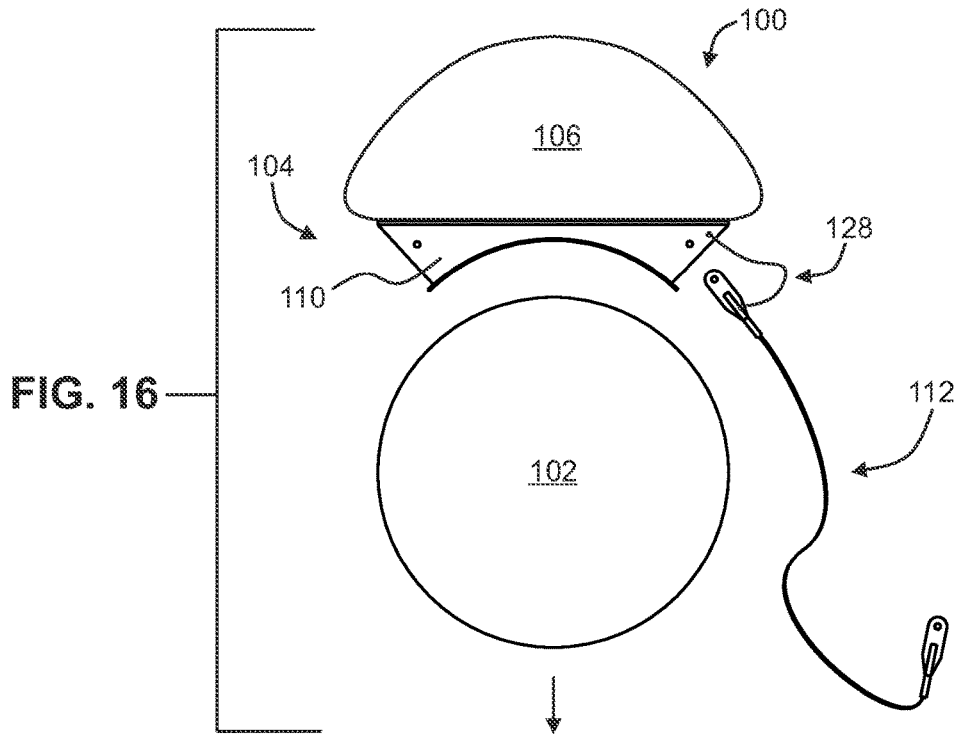
FIG. 16

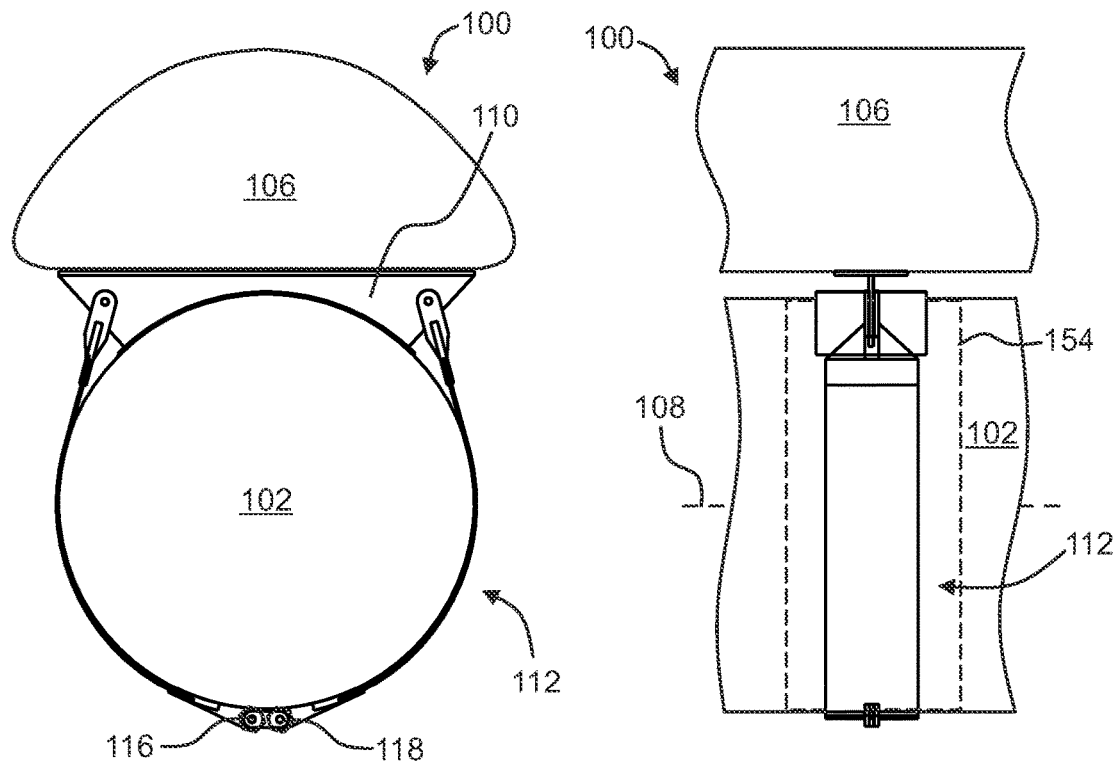
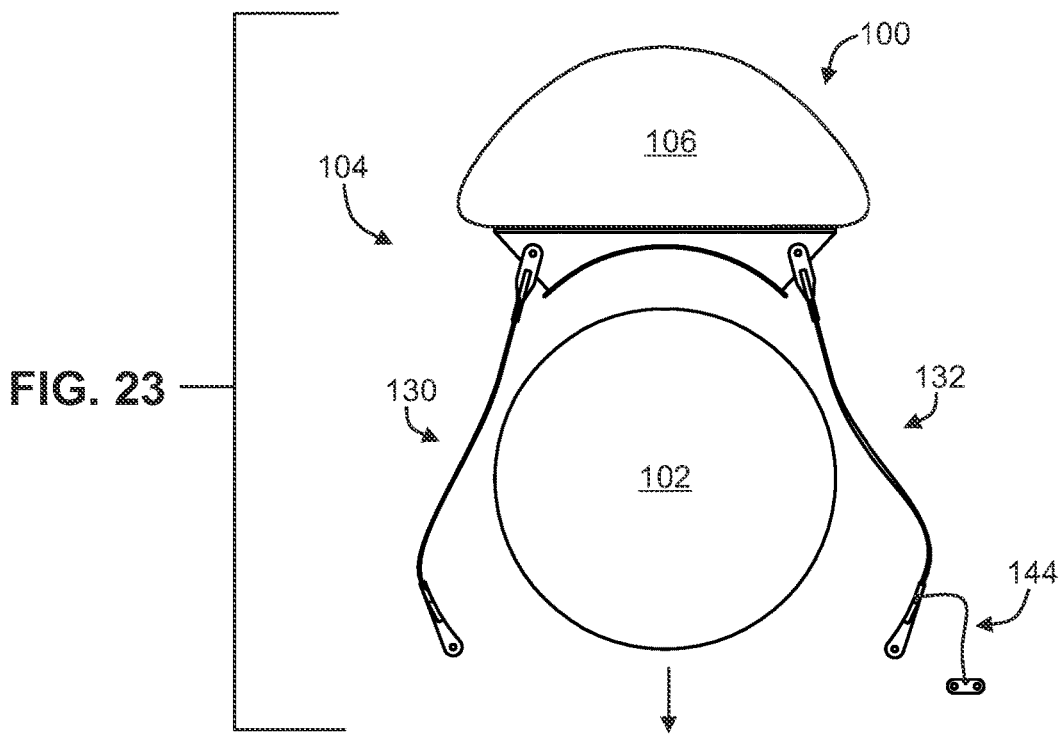

SYSTEM AND METHOD FOR CARRYING AN AERONAUTICAL OR LAUNCH VEHICLE TO ALTITUDE FOR RELEASE TO FLIGHT

RELATED APPLICATIONS

This application claims the benefit of U.S. Provisional Application No. 63/050,690 filed Jul. 10, 2020, the contents of which are incorporated by this reference in their entireties for all purposes as if fully set forth herein.

GOVERNMENT LICENSE RIGHTS

The invention described herein was made by employees of the United States Government and may be manufactured and used by or for the Government of the United States of America for governmental purposes without payment of any royalties thereon or therefor.

TECHNICAL FIELD

The disclosure herein relates generally to systems and methods for carrying aeronautical or launch vehicles to high altitudes from which they can commence independent powered flight.

BACKGROUND

Aerospace vehicles have been carried to altitude for release from other aircraft for many years. In the late 1940's piloted, experimental research aircraft (X-Planes) were carried aloft underneath modified military bomber aircraft (B-29, B-52) by NASA and the Air Force to perform aeronautical flight research experiments. Later, remotely piloted and autonomous vehicles would be carried aloft and released for flight. In all of these examples, the aeronautical vehicle was carried horizontally underneath the carrier aircraft and attached via a releasable, mechanical system, usually a metallic hook and pin arrangement, to hold the aeronautical vehicle captive until it was ready for release at altitude.

In the case of an aeronautical research vehicle, the research vehicle is generally intended to be flown and operated multiple times. These vehicles are designed to operate and maneuver in the atmosphere with sufficient structural margins to allow for robust operation and minimal inspection between flights. For these vehicles, the hook and pin mechanical attachment method worked well as the aeronautical research vehicle wasn't generally optimized for the lightest possible weight. In contrast, launch vehicles are designed to be as light weight as possible to maximize the vehicles performance in placing a satellite into orbit. However, these vehicles are designed to be launched vertically from a ground facility, not horizontally from a carrier aircraft. Carrying the launch vehicle horizontally to altitude subjects it to structural bending loads the vehicle wasn't designed for when launching vertically from a fixed location, ground launch pad. Adding additional structure to the launch vehicle to allow it to be carried horizontally using traditional mechanical attachment methods would add undesirable weight to the launch vehicle and adversely reduce the launch vehicles payload performance to orbit. The problem is especially prevalent when the launch vehicle is mounted under the wing of the carrier aircraft.

Often, the only practical attachment location of the launch vehicle to the carrier aircraft is at the intersection location of the wing with the launch vehicle. This constraint may force the mechanical attachments to be concentrated to the area localized around the aeronautical vehicles Center of Gravity (CG). As most aeronautical vehicles are long and slender, such attachment configuration imposes additional structural bending loads on the captive vehicle due to the cantilevering of the vehicles mass in front of and behind the vehicles Center of Gravity (See, for example, FIG. 1). Additional mechanical structure may have to be added to the launch vehicle to resolve these loads, which may result in an increase in structural mass (and less payload to orbit). Additionally, the loads are not static in nature, as the carrier aircraft must pull G's to turn and maneuver while airborne.

SUMMARY

One or more deficiencies of the prior art are solved by way of embodiments of an adaptable, flexible system and method for attaching lightweight launch vehicles to a carrier aircraft to facilitate launch initiation at high altitude with minimal structural modification to the launch vehicle, in accordance with the present disclosure.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 14 is a diagrammatic front view of the example mounting element and vehicle similar to that of FIG. 12, but wherein the cradle of the mounting element is shown affixed to a carrier aircraft;

FIG. 15 is a partial diagrammatic side view of the example mounting element, vehicle and carrier aircraft of FIG. 14, wherein the mounting element is shown located at a selected mounting station along the carrier aircraft, and the cradle is shown affixed to a corresponding hardpoint of the carrier aircraft;

FIG. 16 is a diagrammatic front view of the example mounting element of FIG. 14, but wherein the retention strap has been activated to the release configuration to release the vehicle to drop away from the cradle;

FIG. 21 is a diagrammatic front view of the example mounting element and vehicle similar to that of FIG. 17, but wherein the cradle of the mounting element is shown affixed to a carrier aircraft;

FIG. 22 is a partial diagrammatic side view of the example mounting element, vehicle and carrier aircraft of FIG. 21, wherein the mounting element is shown located at a selected mounting station along the carrier aircraft, and the cradle is shown affixed to a corresponding hardpoint of the carrier aircraft;

FIG. 23 is a diagrammatic front view of the example mounting element of FIG. 21, but wherein the retention strap has been activated to the release configuration to release the vehicle to drop away from the cradle;

DETAILED DESCRIPTION OF THE PREFERRED EMBODIMENTS

Figure 1:
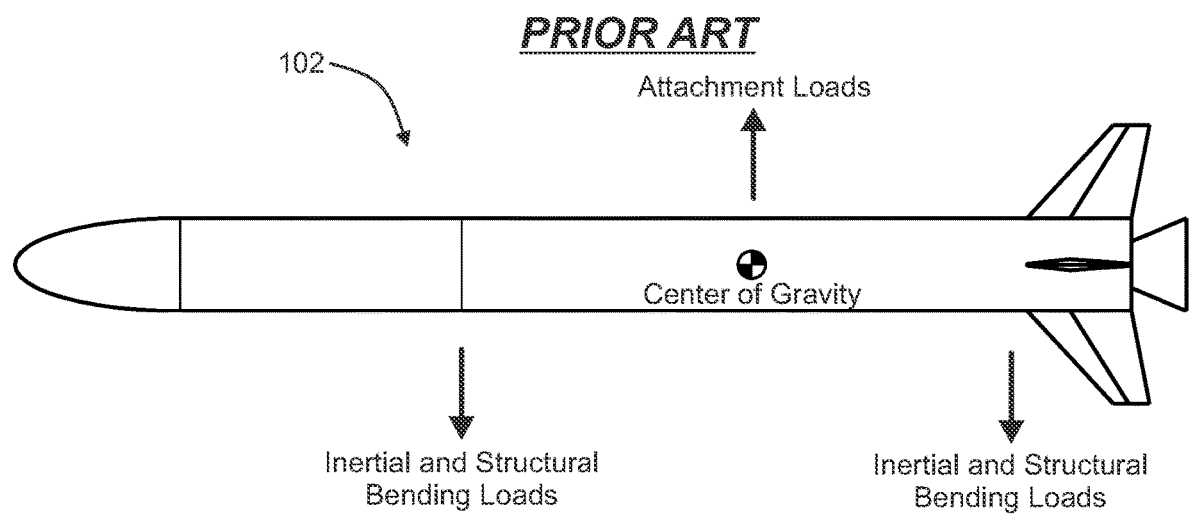
FIG. 1 is a diagrammatic side view illustrating one example conventional aeronautical or launch vehicle, and the loads imposed on that vehicle by certain conventional attachment means.

Referring now to the drawings, like reference numerals designate identical or corresponding features throughout the several views.

Figure 2:
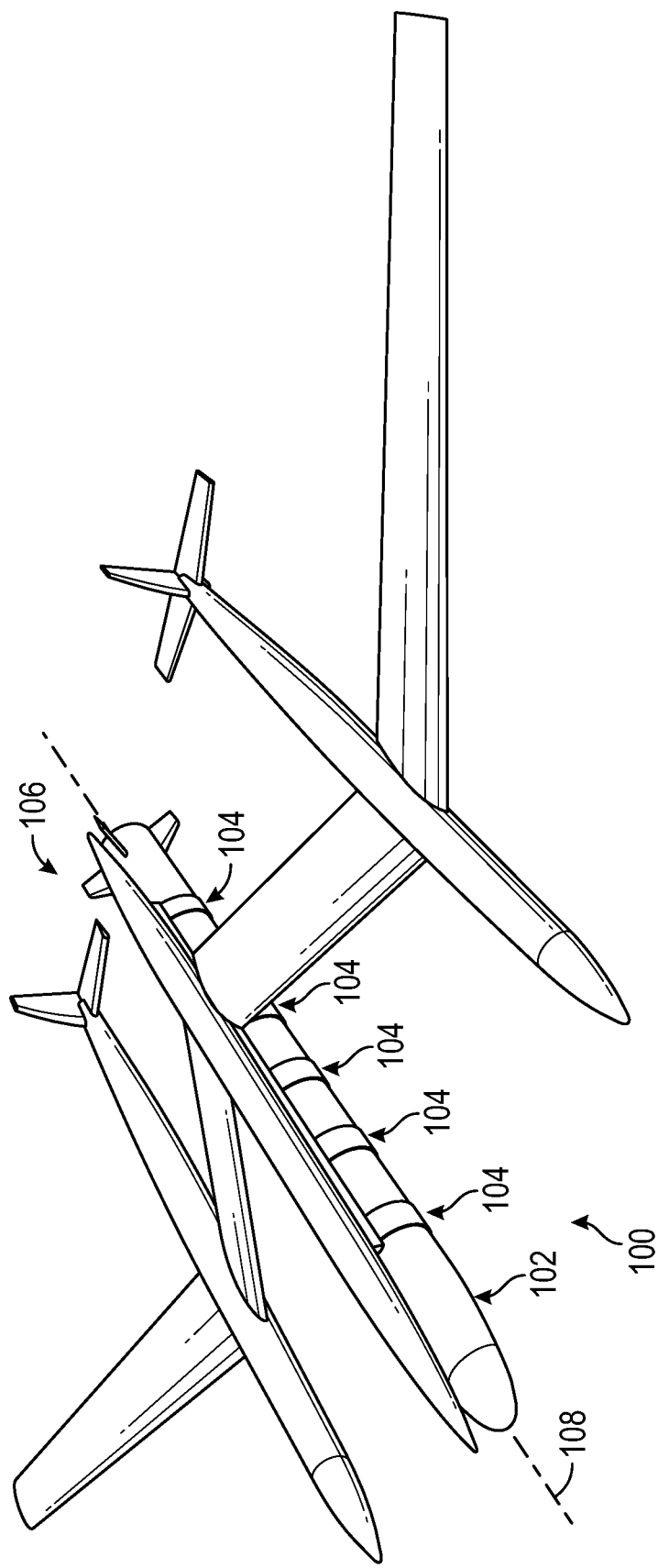
FIG. 2 is a diagrammatic perspective view of one example of a system for carrying an aeronautical or launch vehicle to altitude for release to flight, in accordance with the present disclosure.
Figure 3:
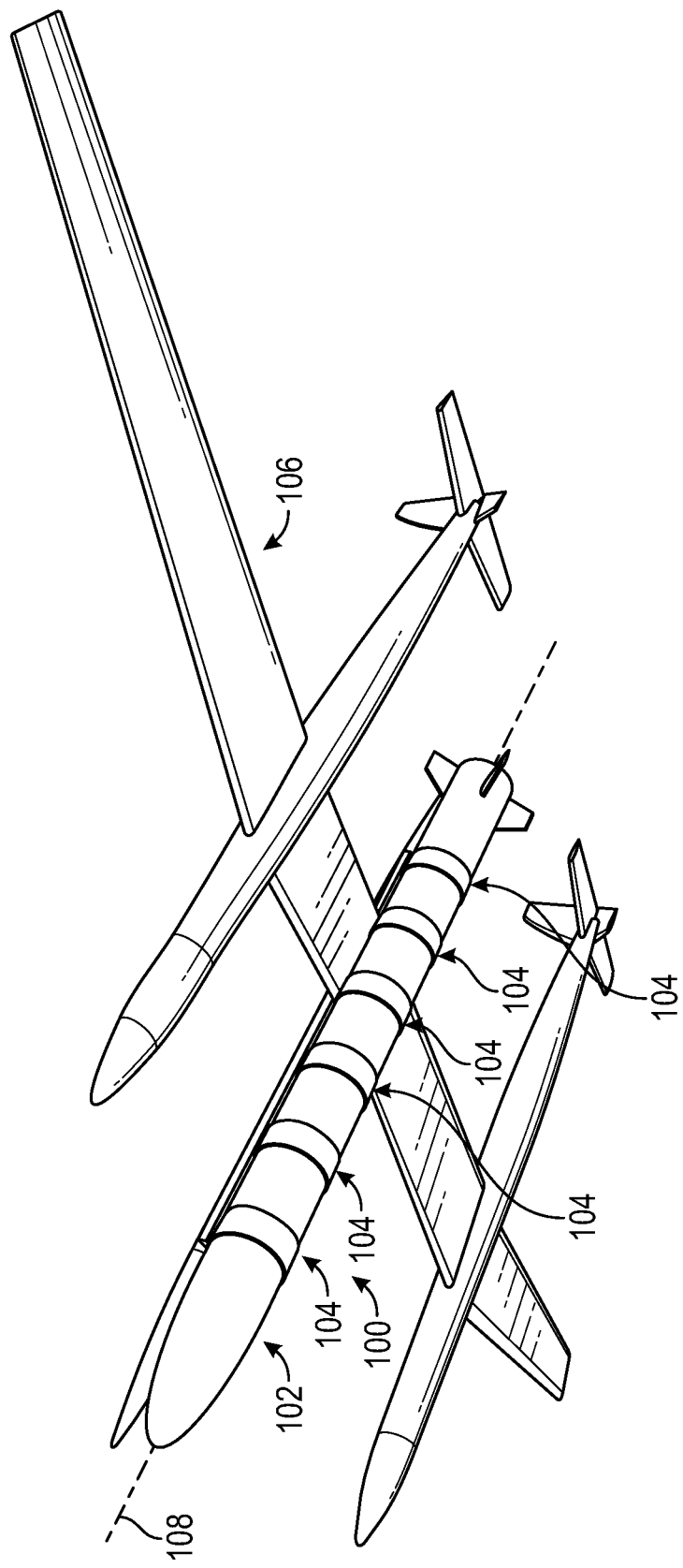
FIG. 3 is a another diagrammatic perspective view of an example of a system for carrying an aeronautical or launch vehicle to altitude for release to flight, in accordance with the present disclosure.
Figure 27:
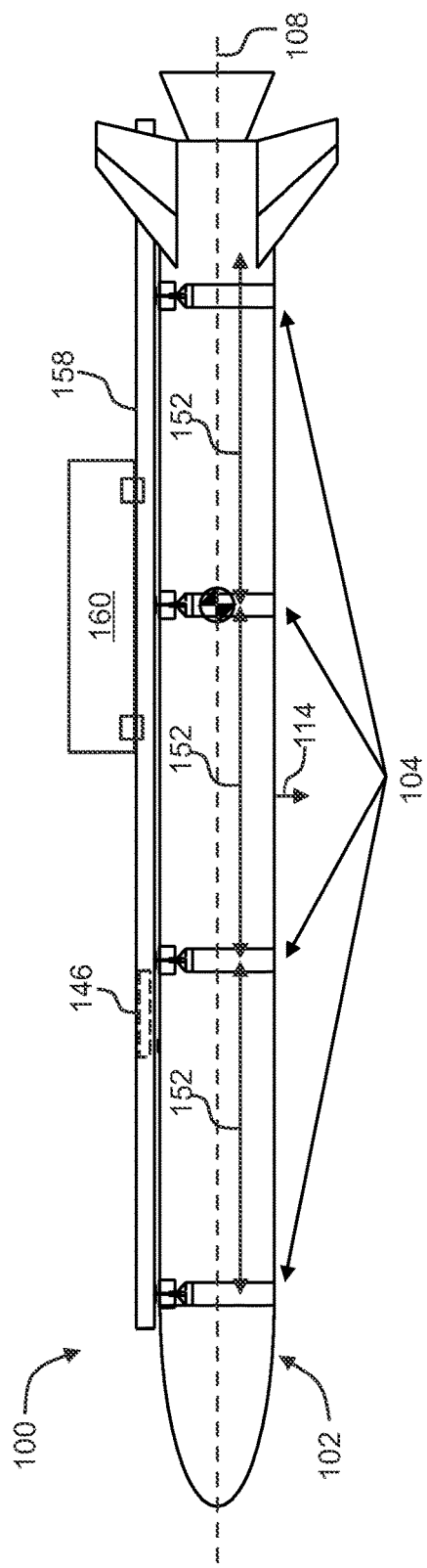
FIG. 27 is a diagrammatic side view of one example system in accordance with the present disclosure.

With reference to the several drawings, embodiments of a system for carrying an aeronautical or launch vehicle to altitude for release to flight are shown generally at 100. Referring in particular to FIGS. 2, 3 and 27, the system 100 may comprise a multiplicity of mounting elements 104 configured to be affixed to a carrier aircraft 106 in distributed fashion along a mounting axis 108.

Figure 26:
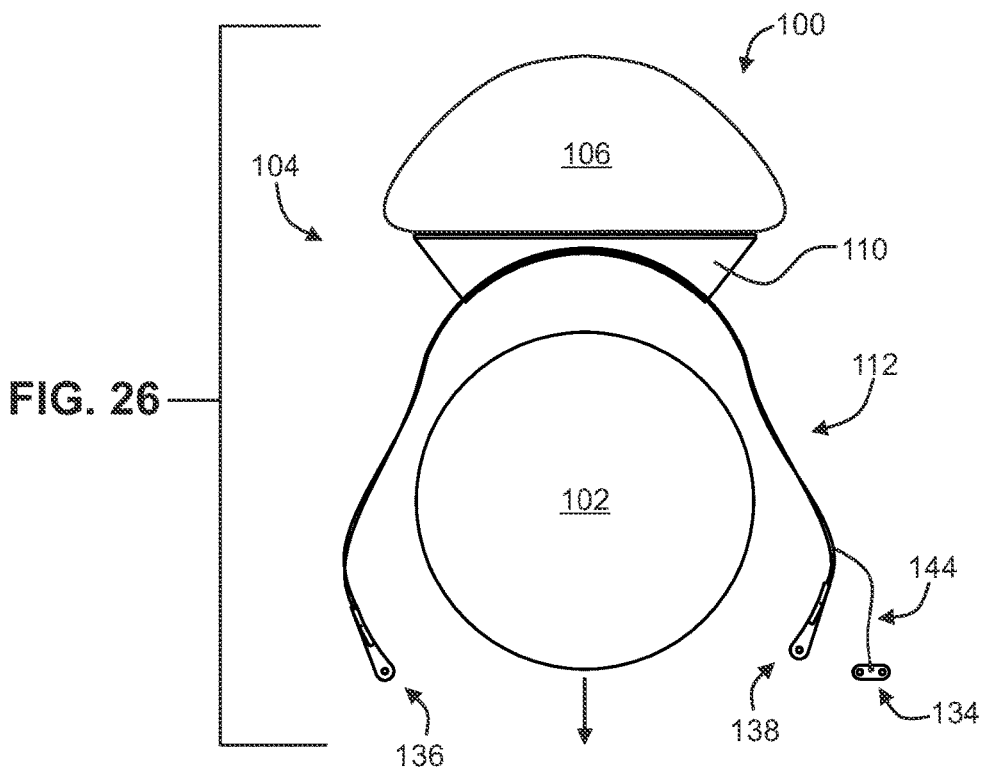
FIG. 26 is a diagrammatic front view of the example mounting element of FIG. 24, but wherein the retention strap has been activated to the release configuration to release the vehicle to drop away from the cradle.

Referring to FIGS. 14 and 21, each mounting element 104 may include a cradle 110 and a retention strap 112. A retention strap may be configured to be suspendedly attached to a respective cradle 110, and is actuatable from a retention configuration (see, for example, FIGS. 14, 21 and 24) to a release configuration (see, for example, FIGS. 16, 23 and 26). The retention configuration enables the retention straps 112 to clampingly secure the vehicle 102 to the respective cradles 110. Actuation of the retention straps 112 from the retention configuration to the release configuration disables the clamping securement and thereby releases the vehicle 102 to drop away from the cradles 110. Referring to FIG. 27, the clamping securement results in the retention straps 112 collectively bearing most or all of the weight 114 of the vehicle 102.

Figure 24:
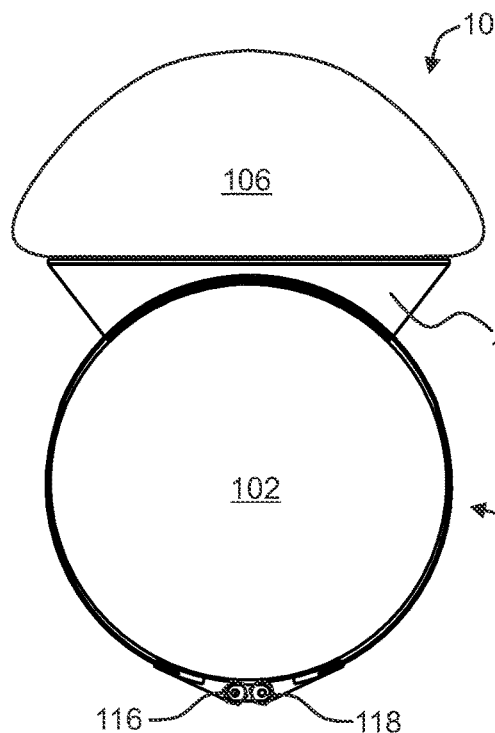
FIG. 24 is a diagrammatic front view of an alternate example mounting element, vehicle and carrier aircraft similar to that of FIG. 21, but wherein the suspended attachment of the retention strap to the cradle is by way of the retention strap passing laterally through the cradle.

In particular implementations of a system 100, each retention strap 112 may include at least one corresponding pyrotechnic fastener 116 or 118 (e.g., an explosive bolt). In such implementations, for each retention strap 112, the actuation may be configured to be by way of detonating the corresponding pyrotechnic fastener. Referring to FIGS. 14, 21 and 24, in certain such implementations of a system 100, each retention strap 112 may include a first pyrotechnic fastener 116 and a second pyrotechnic fastener 118, and, for each retention strap 112, detonation of either the first pyrotechnic fastener 116 or the second pyrotechnic 118 fastener is sufficient to cause the actuation.

Figure 4:
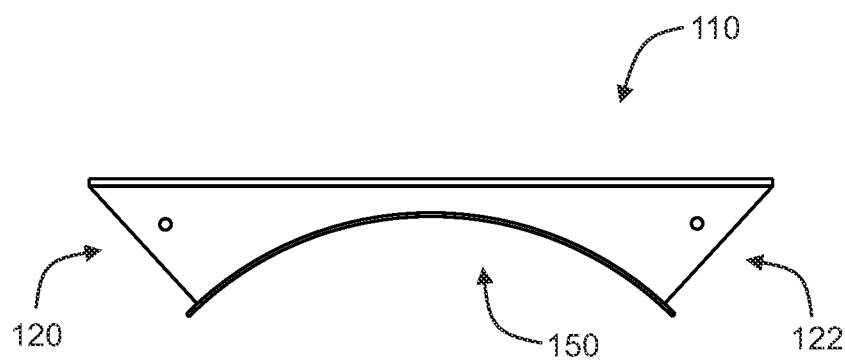
FIG. 4 is a diagrammatic front view one example cradle in accordance with the present disclosure.
Figure 5:
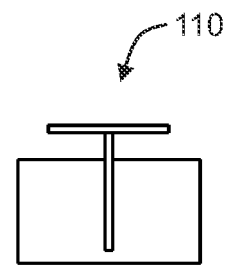
FIG. 5 is a diagrammatic side view the example cradle of FIG. 4.
Figure 6:
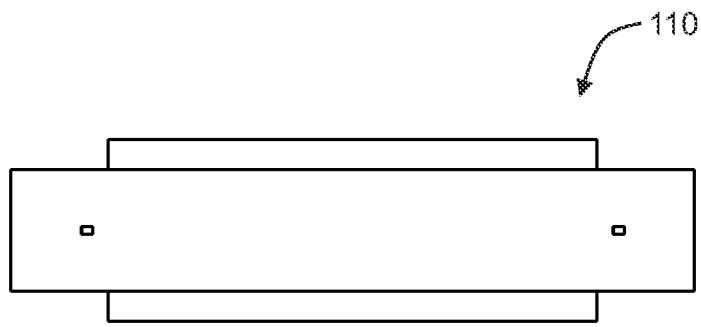
FIG. 6 is a diagrammatic top view the example cradle of FIG. 4.
Figure 7:
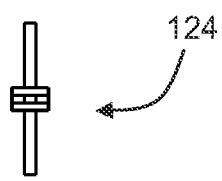
FIG. 7 is a diagrammatic top view of one example end of a retention strap in accordance with the present disclosure.
Figure 8:
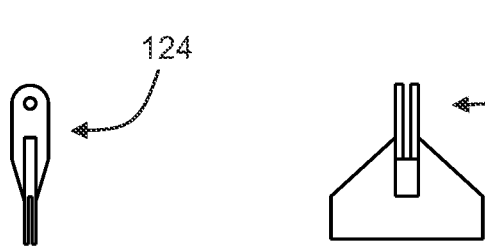
FIG. 8 is a diagrammatic front view of the retention strap end of FIG. 7.
Figure 9:
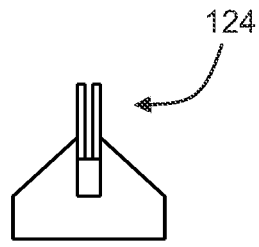
FIG. 9 is a diagrammatic side view of the retention strap end of FIG. 7.
Figure 10:
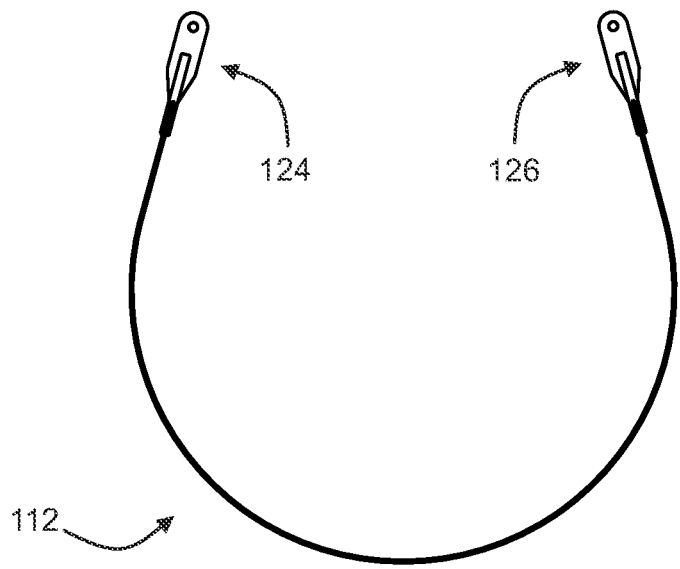
FIG. 10 is a diagrammatic front view of one example of a retention strap in accordance with the present disclosure.
Figure 11:
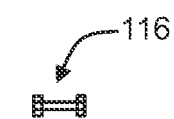
FIG. 11 is a diagrammatic side view of one example of a pyrotechnic fastener in accordance with the present disclosure.
Figure 12:
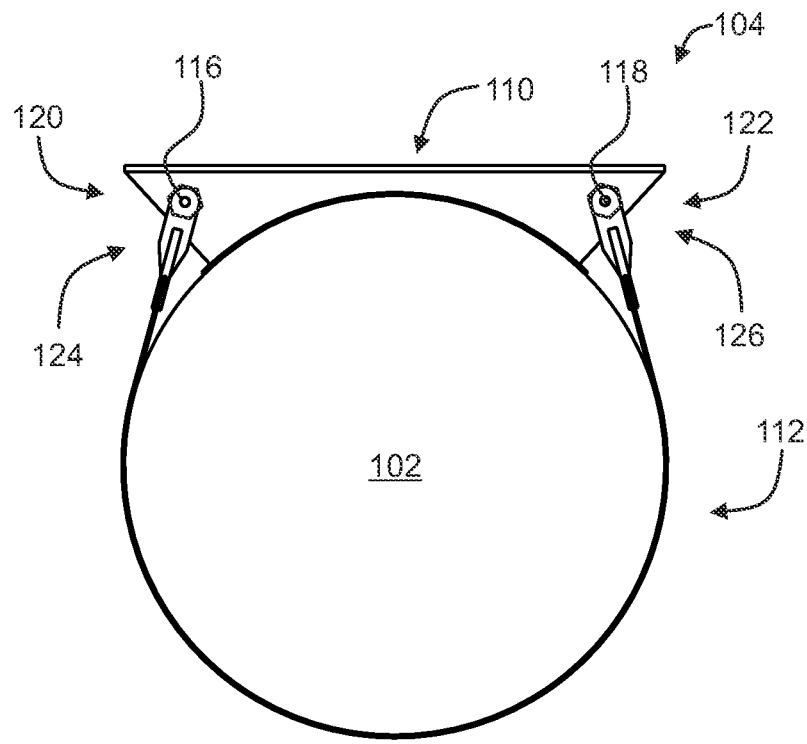
FIG. 12 is a diagrammatic front view of one example of a mounting element in accordance with the present disclosure, wherein the example mounting element incorporates the example retention strap of FIG. 10, and a vehicle is shown clampingly secured to the respective cradle by way of the retention strap being in its retention configuration.
Figure 13:
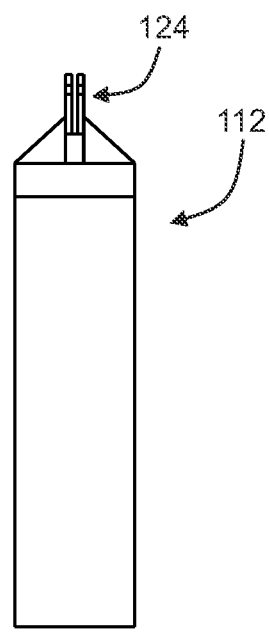
FIG. 13 is a diagrammatic side view of the example retention strap of FIG. 10.

Referring to FIG. 4, the cradles 110 may have a first lateral side 120 and a second lateral side 122 disposed oppositely of one another. Referring to FIG. 10, the retention strap 112 may have a first end 124 and a second end 126. Referring to FIG. 12, in certain implementations of a system 100, the suspended attachment of the retention straps 112 to the cradles 110 may be by way of a first attachment of the first end 124 to the first lateral side 120 and second attachment of the second end 126 to the second lateral side 122. In such system implementations, the first attachment may be by way of the first pyrotechnic fastener 116, and the second attachment may be by way of the second pyrotechnic fastener 118. Moreover, referring to FIG. 16, mounting elements 104 may preferably include a strap lanyard 128 coupling (e.g., tethering) the retention strap 112 to the cradle 110.

Figure 17:
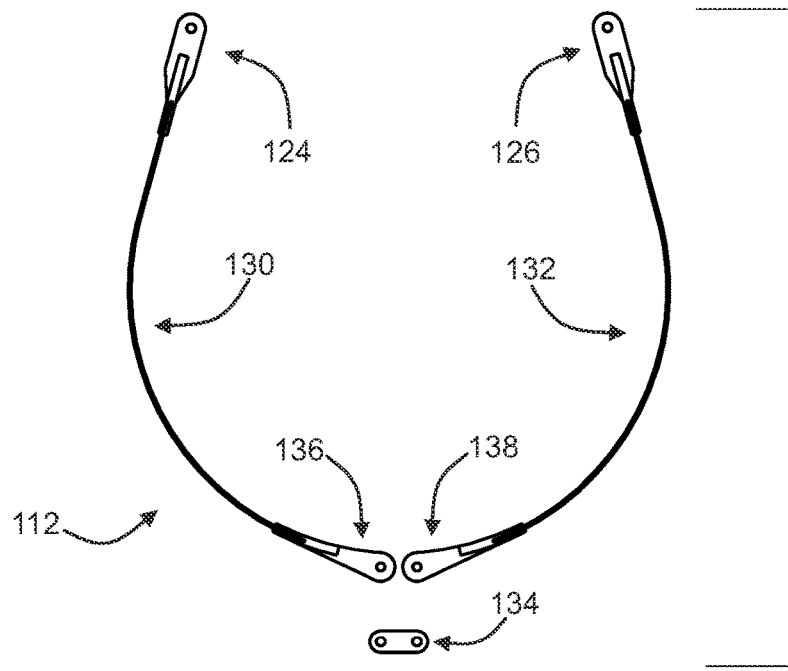
FIG. 17 is a diagrammatic front view of an alternate example of a retention strap in accordance with the present disclosure, wherein the components of the retention strap are shown disassembled.
Figure 18:
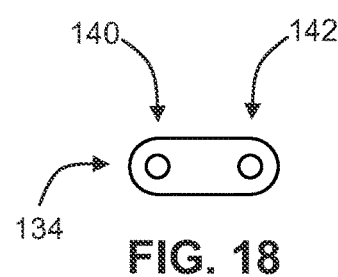
FIG. 18 is a diagrammatic front view of one example of a connecting link in accordance with the present disclosure.
Figure 19:
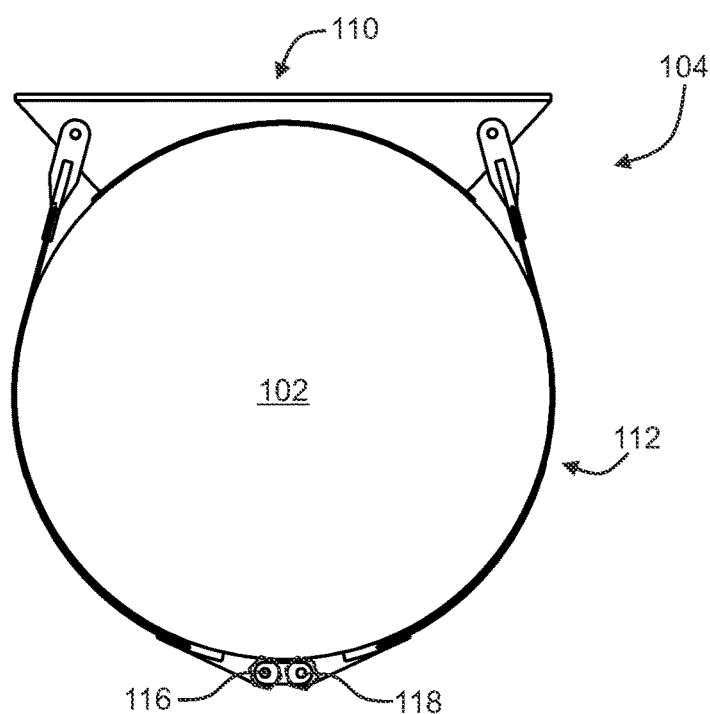
FIG. 19 is a diagrammatic front view of an alternate example of a mounting element in accordance with the present disclosure, wherein the example mounting element incorporates the example retention strap of FIG. 17, and a vehicle is shown clampingly secured to the respective cradle by way of the retention strap being in its retention configuration.
Figure 20:
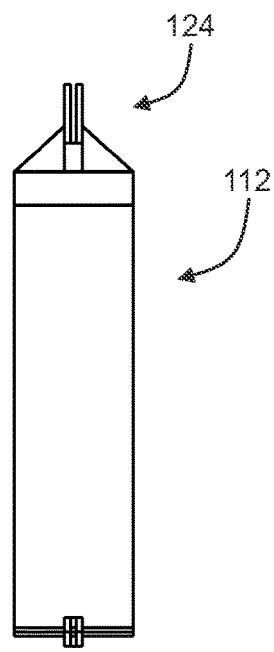
FIG. 20 is a diagrammatic side view of the example retention strap of FIG. 17 in assembled form.

Referring to FIGS. 17-19, in particular implementations of a mounting element 104, the retention strap 112 may include a first strap segment 130, a second strap segment 132 and a connecting link 134. The first strap segment 130 may have a first conformal link 136 disposed oppositely of the first end 124. Similarly, the second strap segment 132 may have a second conformal link 138 disposed oppositely of the second end 126. The connecting link 134 may have a first connection portion 140 and a second connection portion 142, the first connection portion 140 being configured to be in a first connection with the first conformal link 136, and the second connection portion 142 being configured to be in a second connection with the second conformal link 138. Referring to FIG. 19, the first connection may be by way of the first pyrotechnic fastener 116, and the second connection may be by way of the second pyrotechnic fastener 118. Moreover, referring to FIG. 23, such implementations of a mounting element 104 may include a link lanyard 144 coupling the connecting link 134 to the cradle 110 or to one of the strap segments.

Figure 28:
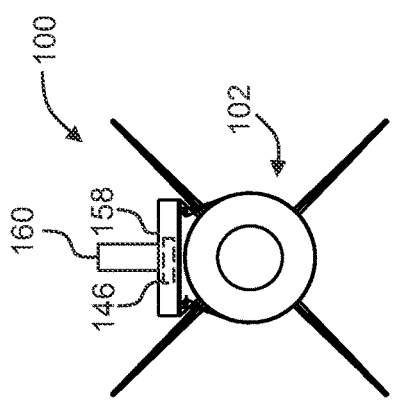
FIG. 28 is a diagrammatic rear view of the example system of FIG. 27.
Figure 31:
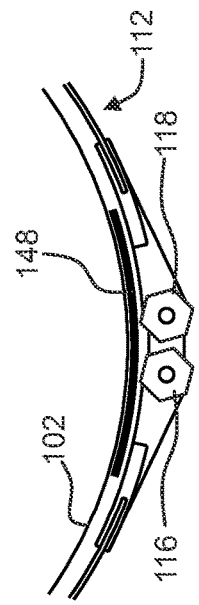
FIG. 31 is a diagrammatic partial front view of one example system in accordance with the present disclosure, wherein an example protective shield is shown disposed between the vehicle and the pyrotechnic fasteners of a mounting element.

Referring to FIGS. 27 and 28, implementations of a system 100 in which the mounting elements 104 include pyrotechnic fasteners may further comprise a detonation controller 146 configured to simultaneously trigger the detonation of all of the pyrotechnic fasteners (116, 118) for each of the retention straps 112. The detonation controller 146 may preferably be located in or on, for example, the carrier aircraft 106 or an intervening adaptor beam 158 disposed between the carrier aircraft 106 and the mounting elements 104. Moreover, referring to FIG. 31, a respective protective shield 148 may be disposed between one or more corresponding pyrotechnic fasteners (116, 118) and the vehicle 102.

Referring to FIGS. 4 and 12, in particular implementation of a mounting element 104, each cradle 110 may include a conformal portion 150 configured to conformingly receive a respective portion of the vehicle 102. The conformal portion 150 may be concave.

Referring to FIG. 27, in certain implementations of a system 100, each adjacent pair of mounting elements 104 may be spaced apart from one another by a respective spacing distance 152 defined along the mounting axis 108. All of the spacing distances 152 may be identical with respect to one another, or at least some of the spacing distances 152 may be varied with respect to one another. The latter configuration may be appropriate, for example, when the weight 114 of a carried launch vehicle 102 is unevenly distributed along its length.

Figure 25:
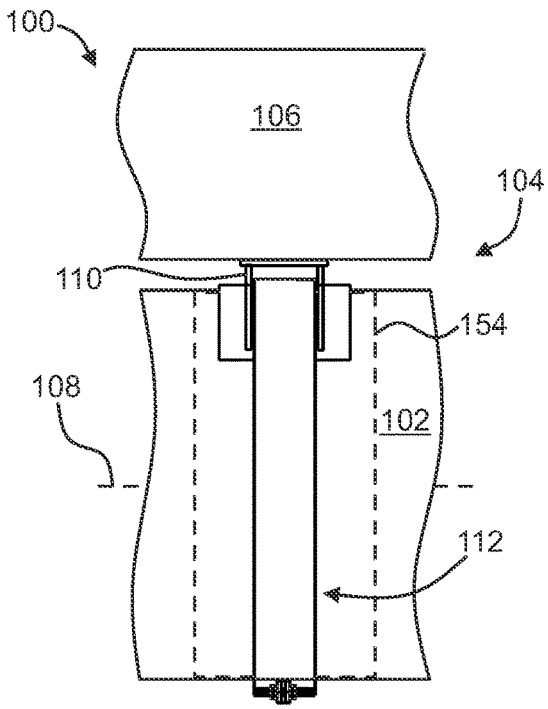
FIG. 25 is a partial diagrammatic side view of the alternate example mounting element, vehicle and carrier aircraft of FIG. 24, illustrating the retention strap passing laterally through the cradle.

Referring FIGS. 15, 22 and 25, in particular implementations of a system 100, the mounting elements 104 may align with corresponding hardpoint locations 154 on the vehicle 102. In certain implementations of a system 100, each cradle 110 may be defined by a respective segment of a unitary structure.

Figure 29:
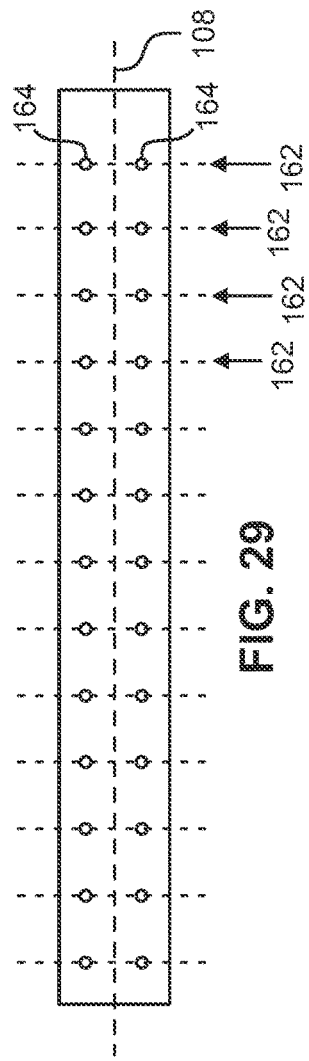
FIG. 29 is a diagrammatic bottom view of one example adaptor beam or a corresponding bottom portion of the carrier aircraft, wherein a plurality of mounting stations are provided for affixing mounting elements to the carrier aircraft at various selected locations along the mounting axis.

Referring to FIGS. 27-29, particular implementations of a system 100 may further comprise an adaptor beam 158 to which each cradle 110 is fastened and by which the mounting elements 104 are affixed to the carrier aircraft 106. Moreover, the adaptor beam 158 may be configured to be mated to the carrier aircraft 106 by way of a military store adaptor 160, such as a conventional MAU-12 ejector rack, or the like.

Figure 30:
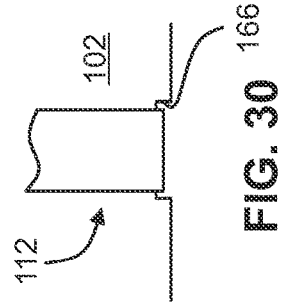
FIG. 30 is a diagrammatic partial side view of one example vehicle with a strap groove for receiving a corresponding retention strap.

Referring to FIG. 30, a vehicle 102 may have a plurality of strap grooves 166 configured to receive a respective securement strap 112 when the vehicle 102 is in said clamping securement, thereby restricting axial movement of the vehicle 102 along the mounting axis 108 with respect to the carrier aircraft 106.

Figure 32:
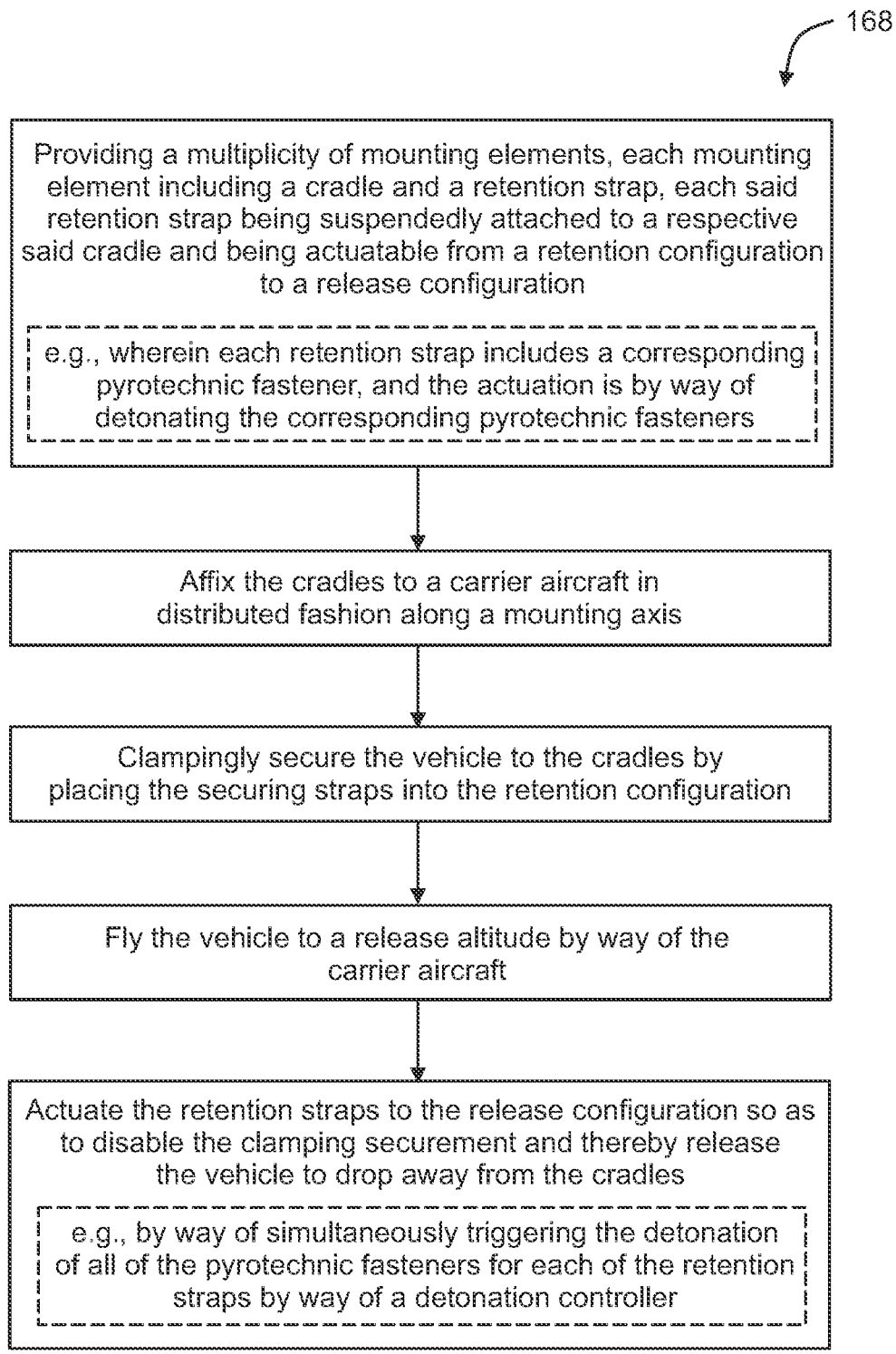
FIG. 32 is a diagrammatic flow chart of one example method for carrying an aeronautical or launch vehicle to altitude for release to flight in accordance with the present disclosure.

Referring for FIG. 32, one example method for carrying an aerospace or launch vehicle to altitude for release to flight in accordance with the present disclosure is generally illustrated at 168. Referring to the respective figures, a multiplicity of mounting elements 104 is provided, each mounting element 104 including a cradle 110 and a retention strap 112. Each said retention strap 112 is suspendedly attached to a respective cradle 110 and is actuatable from a retention configuration to a release configuration. The cradles 110 are affixed to a carrier aircraft 106 in distributed fashion along a mounting axis 108. The vehicle 102 is clampingly secured to the cradles 110 by placing the securing straps 112 into their retention configurations. The vehicle 102 is then flown to a release altitude (typically tens of thousands of feet above sea level) by way of the carrier aircraft 106. The retention straps 112 are then actuated to the release configurations so as to disable the clamping securement and thereby release the vehicle 102 to drop away from the cradles 110. The clamping securement preferably results in the retention straps collectively bearing the weight 114 of the vehicle 102.

In particular implementations of the method 168, each retention strap 112 includes a corresponding pyrotechnic fastener (116, 118), and for each retention strap 112, the actuation is by way of detonating the corresponding pyrotechnic fastener. Each retention strap 112 may include a first pyrotechnic fastener 116 and a second pyrotechnic fastener 118. In such implementations of the method 168, detonation of either the first pyrotechnic fastener 116 or the second pyrotechnic fastener 118 of each retention strap 112 is sufficient to cause the actuation.

In certain implementations of the method 168, the cradles 110 may have a first lateral side 120 and a second lateral side 122 disposed oppositely of one another. Referring to FIG. 10, the retention strap 112 may have a first end 124 and a second end 126. The suspended attachment of the retention straps 112 to the cradles 110 may be by way of a first attachment of the first end 124 to the first lateral side 120 and second attachment of the second end 126 to the second lateral side 122. In such method implementations, the first attachment may be by way of the first pyrotechnic fastener 116, and the second attachment may be by way of the second pyrotechnic fastener 118. Moreover, the mounting elements 104 may preferably include a strap lanyard 128 coupling the retention straps 112 to their respective cradles 110.

In particular implementations of the method 168, the retention strap 112 may include a first strap segment 130, a second strap segment 132 and a connecting link 134. The first strap segment 130 may have a first conformal link 136 disposed oppositely of the first end 124. Similarly, the second strap segment 132 may have a second conformal link 138 disposed oppositely of the second end 126. The connecting link 134 may have a first connection portion 140 and a second connection portion 142. Prior to the step of actuating, the first connection portion 140 is in a first connection with the first conformal link 136, and the second connection portion 142 is in a second connection with the second conformal link 138. The first connection may be by way of the first pyrotechnic fastener 116, and the second connection may be by way of the second pyrotechnic fastener 118. Moreover, the mounting element 104 may include a link lanyard 144 coupling the connecting link to the cradle or to one of the strap segments. The step of actuating may be by way of simultaneously triggering the detonation of all of the pyrotechnic fasteners for each of the retention straps 112 by way of a detonation controller 146.

In certain implementations of the method 168, the retention strap 112 may include a first strap segment 130, a second strap segment 132 and a connecting link 134. The first strap segment 130 may have a first conformal link 136 disposed oppositely of the first end 124. Similarly, the second strap segment 132 may have a second conformal link 138 disposed oppositely of the second end 126. The connecting link 134 may have a first connection portion 140 and a second connection portion 142. Prior to the step of actuating, the first connection portion 140 may be in a first connection with the first conformal link 136, and the second connection portion 142 may be in a second connection with the second conformal link 138. The first connection may be by way of the first pyrotechnic fastener 116, and the second connection may be by way of the second pyrotechnic fastener 118. Moreover, the mounting elements 104 may include a link lanyard 144 coupling the connecting links 134 to the cradles 110 or to one of the strap segments.

In certain implementations of a method 168, each adjacent pair of mounting elements 104 may be spaced apart from one another by a respective spacing distance 152 defined along the mounting axis 108. Depending upon the implementation of the method 168, all of the spacing distances 152 may be identical with respect to one another, or at least some of the spacing distances 152 may be varied with respect to one another.

In particular implementations of a method 168, the mounting elements 104 may align with corresponding hardpoint locations 154 on the vehicle 102. Alternatively or in addition, an adaptor beam 158 may be provided to which each cradle 110 is fastened and by which the mounting elements 104 are affixed to the carrier aircraft 106. Moreover, the adaptor beam 158 may be mated to the carrier aircraft 106 by way of a military store adaptor 160, such as a conventional MAU-12 ejector rack, or the like.

There are many advantages to using a cradle and strap attachment system for carrying aeronautical/launch vehicles, with structural efficiency of the launch vehicle being the primary reason, and cost and simplicity being secondary, but beneficial. Clamping the aeronautical/launch vehicle to a series of upper-surface, conformal cradles along the vehicles length using multiple metallic or composite straps allows for an even distribution of the structural and inertial bending loads along the vehicles length, with the straps positioned at specific hard points already designed into the aerospace vehicle for horizontal ground transport. Attaching the conformal cradles to the bottom of a structurally stiff, extended-length, underwing mount pylon, or aircraft center fuselage, allows for the resultant vehicle structural loads to be transferred into the supporting aircraft structure, and enables the launch vehicle to be kept light, with minimal weight increase to the launch vehicle (compared to the vehicles vertical ground launch design).

The lower surface of the carrier aircraft 106 that the cradles attach to would preferably have a series of attachment holes (e.g., mounting apertures 164) along its length that would allow for alternate cradles (and straps) to be mounted to the carrier aircraft 106 at various longitudinal locations (e.g., mounting stations 162) to accommodate additional launch vehicles 102 of varying sizes and shapes. The straps are designed to clamp the launch vehicle to the bottom of the series of cradles distributed along the top of the launch vehicle. Referring to FIGS. 2 and 3, the straps would be located to circumscribe at least a portion of the diameter of the launch vehicle 102 at designated hardpoint locations 154 so that the launch vehicle 102 would not have to support its own weight 114 along its length. The straps could be either metallic or composite in composition, and could be attached to each cradle on both sides of the cradle with attachment bolts, encapsulating the launch vehicle at each longitudinal mounting station 162.

There are at least two similar, but distinct approaches envisioned for enabling the release of the launch vehicle 102 from the carrier aircraft 106. In the first approach, the bolts attaching each strap to each side of its associated cradle may be explosive, preferably with dual initiators in each bolt for extreme reliability. All of the explosive bolts would be fired simultaneously via a common, commanded electrical signal, releasing the straps, and resultingly releasing the launch vehicle from the carrier aircraft. Preferably, for each cradle, only one of the two explosive bolts would have to fire to release its strap (and the launch vehicle), further reducing the likelihood of the launch vehicle becoming a hung store. If desired, a short lanyard could be attached to each strap from each cradle that would retain it for use on future launches. Also, the explosive bolts could utilize a small, protective shield 148 to protect the launch vehicle from the force and debris of the explosive bolts firing. In the second approach, each cradle may have two separate strap segments, each affixed on one end to opposite sides of its cradle by a conventional bolt. The mating ends of each strap segment may be connected at the bottom, center location of the launch vehicle by two, dual initiated, explosive bolts mounted in series with a small bracket (see, for example, FIG. 19). All other aspects of the electrical firing system may be the same as the first approach. However, in this implementation, there would be no need for lanyards to retain the straps for re-use as each strap could remain attached to the side of its respective cradle.

The following listing matches certain terminology used within this disclosure with corresponding reference numbers used in the non-limiting embodiments illustrated in the several figures.

100 system
102 vehicle (e.g., launch vehicle or aeronautical vehicle)
104 mounting element
106 carrier aircraft
108 mounting axis
110 cradle
112 retention strap
114 weight (weight direction)
116 pyrotechnic fastener (e.g., first pyrotechnic fastener)
118 pyrotechnic fastener (e.g., second pyrotechnic fastener)
120 first lateral side (of cradle)
122 second lateral side (of cradle)
124 first end (of retention strap)
126 second end (of retention strap)
128 strap lanyard (e.g., coupling retention strap to respective cradle)
130 first strap segment (of retention strap)
132 second strap segment (of retention strap)
134 connecting link (of retention strap)
136 first conformal link (of first strap segment)
138 second conformal link (of second strap segment)
140 first connection portion (of connecting link)
142 second connection portion (of connecting link)
144 link lanyard (e.g., coupling connecting link to cradle or strap segment)
146 detonation controller
148 protective shield
150 conformal portion (of cradle)

152 spacing distance (e.g., between adjacent pairs of mounting elements)
154 hardpoint location (on the vehicle)
156 unitary structure (e.g., comprising segments defined by the mounting elements)
158 adaptor beam
160 military store adaptor
162 mounting stations (e.g., selectable; e.g., located directly on carrier aircraft or on adaptor beam)
164 mounting apertures (for mounting cradle to selected mounting station)
166 strap grooves (on vehicle, e.g., extending circumferentially thereabout)
168 method While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for carrying an aerospace or launch vehicle to altitude for release to flight, the method comprising:
providing a multiplicity of mounting elements, each mounting element including a cradle and a retention strap, each said retention strap being suspendedly attached to a respective said cradle and being actuatable from a retention configuration to a release configuration;
providing an adaptor beam to which each cradle is fastened;
affixing the cradles to a carrier aircraft in distributed fashion along a mounting axis by mating the adaptor beam to the carrier aircraft by way of a military store adaptor;
clampingly securing the vehicle to the cradles by placing the securing straps into the retention configuration;
flying the vehicle to a release altitude by way of the carrier aircraft; and
actuating the retention straps to the release configuration so as to disable the clamping securement and thereby release the vehicle to drop away from the cradles;
wherein
(a) each retention strap includes a first pyrotechnic fastener and a second pyrotechnic fastener;
(b) detonation of either the first pyrotechnic fastener or the second pyrotechnic fastener of each retention strap is sufficient to cause the actuation; and
(c) the first pyrotechnic fastener and the second pyrotechnic fastener are each an explosive bolt.

2. A system for carrying an aeronautical or launch vehicle to altitude for release to flight, the system comprising:
a multiplicity of mounting elements configured to be affixed to a carrier aircraft in distributed fashion along a mounting axis, each mounting element including a cradle and a retention strap, each retention strap being configured to be suspendedly attached to a respective said cradle, each retention strap being actuatable from a retention configuration to a release configuration;
wherein the retention configuration enables the retention straps to clampingly secure the vehicle to the respective cradles;
wherein the actuation of the retention straps from the retention configuration to the release configuration disables the clamping securement and thereby releases the vehicle to drop away from the cradles;
wherein
(a) each retention strap includes a first pyrotechnic fastener and a second pyrotechnic fastener; and
(b) for each retention strap, detonation of either the first pyrotechnic fastener or the second pyrotechnic fastener is sufficient to cause the actuation;
wherein for each said mounting element,
(a) the cradle has a first lateral side and a second lateral side disposed oppositely of one another;
(b) the retention strap has a first end and a second end;
(c) the suspended attachment is by way of a first attachment of the first end to the first lateral side and a second attachment of the second end to the second lateral side;
(d) the retention strap includes a first strap segment, a second strap segment and a connecting link;
(e) the first strap segment has a first conformal link disposed oppositely of the first end;
(f) the second strap segment has a second conformal link disposed oppositely of the second end;
(g) the connecting link has a first connection portion and a second connection portion, the first connection portion being configured to be in a first connection with the first conformal link, and the second connection portion being configured to be in a second connection with the second conformal link;
(h) the first connection is by way of the first pyrotechnical fastener; and
(i) the second connection is by way of the second pyrotechnic fastener; and
wherein each said mounting element includes a link lanyard coupling the connecting link to the cradle or to one of the strap segments.

3. A mounting element for facilitating carrying an aeronautical or launch vehicle to altitude for release to flight, the mounting element comprising:
a cradle configured to be affixed to a carrier aircraft;
a retention strap configured to be suspendedly attached to the cradle, and being actuatable from a retention configuration to a release configuration; and
a link lanyard;
wherein
(a) the retention configuration enables the retention strap to clampingly secure the vehicle to the respective cradles;
(b) the actuation from the retention configuration to the release configuration disables the clamping securement and thereby releases the vehicle to drop away from the cradle;
(c) the retention strap includes a first pyrotechnic fastener and a second pyrotechnic fastener;
(d) detonation of either the first pyrotechnic fastener or the second pyrotechnic fastener is sufficient to cause the actuation;
(e) the cradle has a first lateral side and a second lateral side disposed oppositely of one another;
(f) the retention strap has a first end and a second end;
(g) the suspended attachment is by way of a first attachment of the first end to the first lateral side and a second attachment of the second end to the second lateral side;
(h) the retention strap includes a first strap segment, a second strap segment and a connecting link;
(i) the first strap segment has a first conformal link disposed oppositely of the first end;
(j) the second strap segment has a second conformal link disposed oppositely of the second end;

(k) the connecting link has a first connection portion and a second connection portion, the first connection portion being configured to be in a first connection with the first conformal link, and the second connection portion being configured to be in a second connection with the second conformal link;

(l) the first connection is by way of the first pyrotechnical fastener;

(m) the second connection is by way of the second pyrotechnic fastener; and (n) the link lanyard couples the connecting link to the cradle or to one of the strap segments.

4. A method for carrying an aerospace or launch vehicle to altitude for release to flight, the method comprising:

providing a multiplicity of mounting elements, each mounting element including a cradle and a retention strap, each said retention strap being suspendedly attached to a respective said cradle and being actuatable from a retention configuration to a release configuration;

affixing the cradles to a carrier aircraft in distributed fashion along a mounting axis;

clampingly securing the vehicle to the cradles by placing the securing straps into the retention configuration;

flying the vehicle to a release altitude by way of the carrier aircraft; and actuating the retention straps to the release configuration so as to disable the clamping securement and thereby release the vehicle to drop away from the cradles;

wherein (a) each retention strap includes a first pyrotechnic fastener and a second pyrotechnic fastener; and (b) detonation of either the first pyrotechnic fastener or the second pyrotechnic fastener of each retention strap is sufficient to cause the actuation;

wherein for each said mounting element (a) the cradle has a first lateral side and a second lateral side disposed oppositely of one another;

(b) the retention strap has a first end and a second end;

(c) the suspended attachment is by way of a first attachment of the first end to the first lateral side and a second attachment of the second end to the second lateral side;

(d) wherein for each said mounting element, (e) the retention strap includes a first strap segment, a second strap segment and a connecting link;

(f) the first strap segment has a first conformal link disposed oppositely of the first end;

(g) the second strap segment has a second conformal link disposed oppositely of the second end;

(h) the connecting link has a first connection portion and a second connection portion;

(i) prior to the step of actuating, the first connection portion is in a first connection with the first conformal link, and the second connection portion is in a second connection with the second conformal link;

(j) the first connection is by way of the first pyrotechnical fastener; and (k) the second connection is by way of the second pyrotechnic fastener; and wherein each said mounting element includes a link lanyard coupling the connecting link to the cradle or to one of the strap segments.

\* \* \* \* \*